June 12, 1951 H. J. ROSENBERGER 2,556,220
CODE TAPE PUNCHING APPARATUS
Filed Nov. 23, 1945
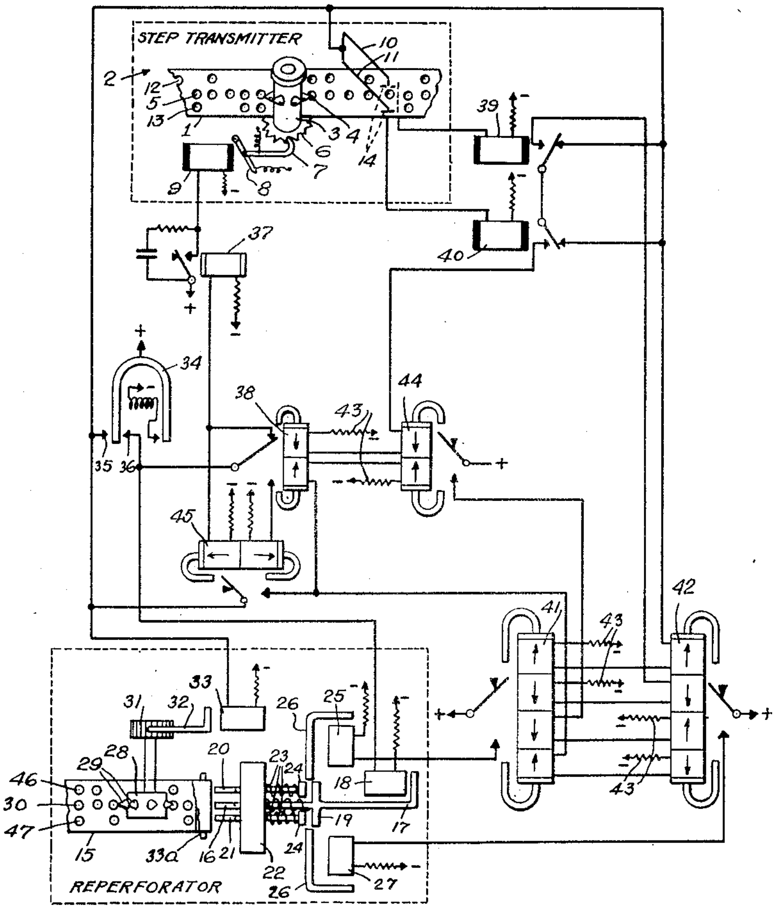
INVENTOR.
HAROLD J. ROSENBERGER
BY Geo. G. Hyde
ATTORNEY Patented June 12, 1951

2,556,220

UNITED STATES PATENT OFFICE 2,556,220

CODE TAPE PUNCHING APPARATUS

Harold J. Rosenberger, Rockville Centre, N. Y., assignor to All America Cables & Radio, Inc., New York, N. Y., a corporation of New York Application November 23, 1945, Serial No. 630,411

8 Claims. (Cl. 164—115)

This invention relates to automatic telegraph systems employing punched paper tape and particularly to apparatus for automatically punching code signals in such tape.

The general object of the invention is to provide improved apparatus actuated by a tape carrying signals punched in cable code for automatically punching the same signals on a second tape in Wheatstone code. A further purpose is to provide apparatus of this type employing electrical equipment of standard kinds. More specifically, the apparatus is adapted for construction by combining known and proven types of apparatus used in automatic telegraph systems, including a step transmitter, a reperforator, a vibrating contact fork and relays. An advantage of this arrangement is the elimination of mechanical devices, such as those which employ segmented rings and traveling contacts.

Other objects and advantages will appear from the following description considered in connection with the accompanying drawing, which is a diagram of one embodiment of the invention.

Both the cable code and the Wheatstone code are adapted for the transmission of dots and dashes, such as those of the standard International telegraph code. The paper tape used for sending cable code is punched with a series of center holes at uniform intervals, an additional hole above a center hole being punched for a dot and an additional hole below a center hole for a dash, a center hole alone representing a space. The paper tape for sending Wheatstone code is provided with a similar series of center holes, additional holes above and below the same center hole indicating a dot while a hole above a center hole followed by a hole below the next succeeding center hole indicates a dash, a center hole alone indicating a space.

Cable code tape is fed into apparatus embodying the invention, which automatically punches blank tape with the holes representing the Wheatstone code the same signal characters as those appearing on the cable code tape. In the illustrated embodiment the cable code tape 1 is fed into a step-by-step cable transmitter indicated generally at 2, the Commercial Cable Company transmitter No. 101-A being suitable. In this transmitter the tape 1 is fed by means of a feed cylinder 3 provided with feed pins 4 positioned to enter the center holes 5 of the tape, and a ratchet 6 on the cylinder engaged by pawl 7 connected to the armature 8 of feed relay 9, the arrangement being such that when relay 9 is energized the tape 1 will be fed one interval between center holes 5. A dot pecker 10 and a dash pecker 11, arranged in transverse alignment at an operating station, engage the tape in register with the upper or dot holes 12 and the lower or dash holes 13. Contacts 14 on the opposite side of the tape 1 are arranged for engagement by one of the peckers when the tape is stopped with a hole in register with either pecker.

With this arrangement, when the tape 1 is fed one step either the dot pecker 10 or the dash pecker 11 will make a circuit connection through the respective contact 14 if the feed step brings a dot hole or a dash hole beneath the corresponding pecker.

Perforating apparatus is also provided for punching a series of center holes in Wheatstone code tape 15, and for punching holes above and below the center holes to produce Wheatstone code characters in accordance with the selective operation of electromagnets controlling the punches. The illustrated type of perforator construction is employed in the All America Cables and Radio reperforator No. 101-A. The mechanism is illustrated diagrammatically and includes a center punch 16 having an extension 17 carrying the armature of center punch relay 18. Extension 17 also carries a cross-bar 19 projecting at both sides in register with the ends of the upper hole punch 20 and the lower hole punch 21, slidably mounted in guide block 22 which also guides the center punch 16. Punches 20 and 21 are biased toward cross arm 19 by springs 23, but their end blocks 24, although aligned with cross arm 19, are located just beyond the end of the punching stroke of the cross arm, so that the latter does not normally engage the end blocks and actuate the latter punches when the center punch 16 is actuated.

The upper hole punch 20 is actuated when the upper hole relay 25 is energized, during the punching stroke of cross-arm 19, the relay armature being connected to a selector arm 26 which is shifted into position between cross-bar 19 and the appropriate end block 24, so that the cross-bar 19 operates punch 20 through arm 26 when the center punch 16 is actuated. The lower hole punch 21 is similarly actuated through a selector arm 26 connected to the armature of the lower hole relay 27. The paper tape 15 is fed by steps equal to the center hole spacing through a drive cylinder 28 provided with pins 29 engaging the center holes 30 and driven by a ratchet 31 engaged by pawl 32 connected to the armature of feed relay 33. A punch die 33*a* supports tape 15 in register with the punches.

With this type of reperforator construction the feed relay 33 and the center punch relay 18 are automatically actuated, in alternation while the upper hole relay 25 and lower hole relay 27 are selectively actuated to provide the desired sequence of signal holes. The feed and center punch relays are operated through a vibrating contact fork 34 connected to the positive terminal of a current source and maintained in vibration in well known manner, that is, by the intermittent energization of the actuating electromagnetic winding associated therewith; said winding, as shown, having one terminal thereof in the form of a contact element located in the path of swing of one prong of the fork, so that there is one make and one break of the actuating circuit of said winding, during each full cycle. The fork alternately contacts terminal 35, connected through the feed relay 33 to a source of negative potential, and terminal 36, connected through center punch relay 18 to said source.

The invention comprises an automatically operating electrical arrangement for applying the currents derived from the cable tape peckers 10 and 11 to the upper and lower hole relays 25 and 27 of the reperforator in appropriate manner to produce the Wheatstone code punch holes in tape 15 corresponding to the characters punched in the cable tape 1. This is advantageously accomplished by a system consisting solely of relays. The system as shown is arranged to feed the cable tape 1 when the fork 34 contacts terminal 36, simultaneously with the punching of a hole or holes in the Wheatstone tape 15, and to set the reperforator for punching the holes, simultaneously with the feed of the tape 15, when fork 34 next contacts terminal 35. Since a dash signal on the cable tape requires only one feed step or center hole interval whereas it includes two steps on the Wheatstone tape, the system is arranged to throw out the cable tape feed for one step when a dash signal occurs, the reperforator being set to punch the upper hole first and then to punch the succeeding lower hole while the cable tape feed is out of operation for one step.

In the illustrated embodiment the cable tape 1 is fed by energizing the winding of the feed or stepping relay 9 through the front contact and armature of feed actuating relay 37, the armature being connected to a positive source. Relay 37 is energized from fork terminal 36 through the armature and upper contact of polarized double winding relay 38. All references herein to the relative vertical or horizontal positions of circuit parts are based solely on their arrangement in the drawing, and do not restrict the arrangement of the apparatus in practice. In the multiple winding polarized relays shown in the drawing the direction in which each winding throws the armature is indicated by an arrow.

The selective operation of the reperforator is controlled by the dot relay 39 and the dash relay 40, the windings of which are each connected between a negative source and a contact 14 registering with the dot pecker 10 or the dash pecker 11, respectively. These two relays selectively energize the upper hole selecting relay 41 and the lower hole selecting relay 42. Each of the latter relays is polarized and has four windings, each pair of corresponding windings of the two relays being connected in series through a resistor 43 to a negative source. The armatures of relays 41 and 42 are connected to a positive source, and their upper contacts are dead. The lower contact of relay 41 is connected through the winding of the upper hole relay 25 to a negative source, while the lower contact of relay 42 is connected through the winding of lower hole relay 27 to a negative source, so that the relays 25 and 27 will be selectively energized and deenergized by shifting the armatures of relays 41 and 42 to and from their lower contacts.

The uppermost or first windings of relays 41 and 42 are arranged to shift both armatures into upper or inactive position. The second windings are arranged to shift both armatures into lower position for punching a Wheatstone code dot. The second windings of relays 41 and 42 contain a greater number of turns than the first windings of said relays, and thus produce a greater magnetic flux than said first windings. The third windings are arranged to shift the armature of relay 41 downwardly and the armature of relay 42 upwardly for punching the upper hole constituting the start of a Wheatstone dash, while the fourth windings are arranged to shift the armature of relay 42 downwardly and the armature of relay 41 upwardly for punching the lower hole marking the conclusion of the Wheatstone dash.

The second windings of relays 41 and 42, which set the reperforator in Wheatstone dot position, are connected to the front contact of dot relay 39 and are energized when the latter relay is energized after a dot hole 12 has been fed into position beneath pecker 10. The armatures of relays 39 and 40 are connected, and their back contacts are connected to fork terminal 35, so that relay 39 will be energized under the indicated conditions when fork 34 next engages terminal 35 after the dot hole 12 is fed to the operating station.

The armatures and contacts of relays 39 and 40 are connected in such a way that when both peckers 10 and 11 engage contacts 14, a situation which occurs when there is no cable tape 1 at the operating station, and relays 39 and 40 are both simultaneously energized, there can be no conflict in the operation of the selecting and punching system, since neither circuit from the front contacts of said relays will be connected through fork contact 35 to the positive source.

The Wheatstone dash is punched in tape 15 when the dash relay 40 is energized, through an intermediate system of relays which first energizes the third windings of relays 41 and 42, breaks the cable tape feed circuit for one step while the upper and center holes are being punched in the Wheatstone tape 15, and then energizes the fourth windings of relays 41 and 42 to punch the center and lower holes in the Wheatstone tape after the tape has been fed one step. This intermediate system includes relays 38, 44 and 45, all of which are double winding polarized relays. The upper windings of relays 38 and 44 are connected in series to a negative source through a resistor 43 and are arranged to shift the armatures into lower position. The lower windings, which shift the armatures into upper position, are similarly connected to a negative source through a resistor 43 of lower value.

When dash relay 40, whose winding is connected between a negative source and contact 14 in register with pecker 11, is energized by feeding a hole 13 beneath the latter pecker and the subsequent contact of fork 34 with terminal 35, a circuit is closed from the fork through the front contact of relay 40 and the upper windings of relays 38 and 44. The armature of relay 44, connected to a positive source, engages the lower contact and completes a circuit through the third windings of selecting relays 41 and 42, setting the upper hole relay 25 to punch an upper hole 46. At the same time the armature of relay 38 breaks the cable tape feed circuit through its upper contact and closes a circuit from fork terminal 36 through the right hand winding of relay 45.

When fork 34 next engages terminal 36 and the upper and center holes are punched in Wheatstone tape 15, the cable tape 1 is not fed and the armature of relay 45 is shifted to the right contact. When fork 34 next engages terminal 35 the circuit through the armature of relay 45 will energize the fourth windings of selecting relays 41 and 42, setting the reperforator to punch a lower hole 47. At the same time a branch of said circuit will energize the lower windings of relays 38 and 44, overpowering the upper windings because of the difference in value of resistors 43 and resetting the armatures in upper position. The next engagement between fork 34 and terminal 36 will punch the center and lower holes in tape 15 and will feed cable tape 1. If the next center hole 5 of cable tape 1 is a space the succeeding contact between fork 34 and terminal 35 will reset selecting relays 41 and 42 in upper position by energizing the first windings of the latter relays.

The operation of the system has been described in connection with the specific circuit illustrated. In general, the reperforator is actuated to feed Wheatstone tape 15 when fork 34 contacts terminal 35, and to punch the latter tape when terminal 36 is contacted, simultaneously with the feed of cable tape 1. When the latter feed brings a dot hole 12 beneath pecker 10 the next contact with terminal 35 will set the reperforator to punch upper and lower holes 46 and 47, and the holes will be punched upon the next fork engagement with terminal 36 simultaneously with the feed of cable tape 1. When a dash hole 13 is fed beneath pecker 11 upon fork contact with terminal 36, the next contact with terminal 35 will set the reperforator to punch an upper hole and will also throw out the cable tape feed. Contact with terminal 36 will then punch the upper hole 46 and rearrange the intermediate circuit so that the next contact with terminal 35 will set the reperforator to punch a lower hole and close the cable tape feed circuit. When fork 34 next engages terminal 36 the lower hole 47 will be punched, cable tape 1 will be fed and the relays will be reset to the proper position for the subsequent signal element.

While a preferred embodiment of the invention has been illustrated and described, the specific arrangement disclosed may be varied without departing from the invention. In particular, the relay system which selectively actuates the relay units 41 and 42 may be varied without changing the operation of said units. It is likewise pointed out that while the use of multiple winding polar relays is particularly advantageous in providing a simplified and compact system, single relays may be substituted for certain individual components of this system. Likewise, while the reversible operation of the polar relays as disclosed is obtained by energizing separate windings, this arrangement is not intended to limit the breadth of the invention, since other specific methods of reversing the operating of polar relays are known, such as those involving the use of a three wire power supply or other arrangements for reversing the polarity of the current through a winding. Moreover, certain features may be used with other codes or systems. The fork can be replaced by other suitable devices making the necessary contacts in proper timed relation.

I claim:

1. A system for automatically punching Wheatstone code tape from cable code tape, comprising a source of electrical energy, means for feeding cable code tape to an operating station, means for sensing the holes in said cable tape, means for feeding Wheatstone code tape, means for punching code holes in the Wheatstone code tape including means for punching a center hole, means for punching an upper hole and means for punching a lower hole, a first polar relay having an armature and associated contact connected in series with the upper hole punching means and said source, a second polar relay having an armature and associated contact connected in series with the lower hole punching means and said source, said polar relays under control of said sensing means, and means including a single vibratory element for selectively energizing said polar relays and both said feeding means.

2. A system for automatically punching Wheatstone code tape from cable code tape, comprising means for feeding cable code tape to an operating station, means for sensing the holes in said cable tape, means for feeding Wheatstone code tape, means for punching code holes in the Wheatstone code tape including means for punching a center hole, means for punching an upper hole, and means for punching a lower hole, a first polar relay having an armature and associated contact connected in series with the upper hole punching means and a source of electrical energy, a second polar relay having an armature and associated contact connected in series with the lower hole punching means and a source of electrical energy, each polar relay being provided with a plurality of differentially wound windings, said windings producing different amounts of magnetic flux when energized, each of said windings of one relay being connected in series with a winding of the other relay to form a pair of windings, and means including a single vibratory element for selectively energizing said pairs of windings and both said feeding means.

3. A system as set forth in claim 2 in which the selectively energizing means comprises means operative when a dot hole is located at the station for energizing a pair of said windings arranged to energize the upper and lower hole punching means, and means operative when a dash hole is located at said station for initially energizing a pair of said windings arranged to energize only the upper hole punching means, and also operative after the Wheatstone code tape has been fed one step to energize a pair of said windings arranged to energize only the lower hole punching means.

4. A system for automatically punching Wheatstone code tape from cable code tape, comprising means for feeding cable code tape to an operating station, means for feeding and for punching code holes in Wheatstone code tape, and means for actuating the punching means to punch Wheatstone code dot holes when a cable code tape dot hole is located at the station and Wheatstone code dash holes when a cable code dash hole is located at said station, said actuating means comprising an energizing circuit, means for periodically energizing the circuit, a pair of relays each connected to the energizing circuit through a different one of said holes, each relay having an armature and back and front contacts, the back contacts and armatures being connected in series to said energizing circuit, a dot punching operating circuit connected to one front contact and a dash punching operating circuit connected to the other front contact, said circuits comprising means for preventing energizing of the operating circuits from the energizing circuit when both relays are simultaneously energized.

5. A system for automatically punching Wheatstone code tape from cable code tape, comprising electromagnetic means for feeding punched cable code tape to an operating station, means for sensing the holes in said cable tape, electromagnetic means for punching holes in a second tape according to the Wheatstone code, said punching means under control of said sensing means, electromagnetic means for advancing said second tape past said punching means, and means including a single vibratory switch controlling energization of all of said electromagnetic means.

6. A system for automatically punching Wheatenost code tape from cable code tape, as claimed in claim 5, wherein said means for feeding punched cable tape to an operating station comprises an electromagnetic step relay, said means for advancing said second tape comprises an electromagnetic step relay, and said punching means comprises three separate electromagnetic relays for punching a center hole, a dot hole and a dash hole respectively in said second tape, said center hole punching relay adapted to be energized simultaneously with said feeding step relay, and in alternation with said tape advancing relay, said dot hole punching relay and said dash hole punching relay under control of said sensing means.

7. A system for automatically punching Wheatstone code tape from cable code tape as claimed in claim 6, further comprising electromagnetic relay means disposed between said sensing means and said cable feeding means, said relay means under control of said sensing means, whereby said feeding relay is deenergized during each half of the vibrating cycle of said switch and while said relay means is in selected position.

8. A system for automatically punching Wheatstone code tape from cable code tape as claimed in claim 6, wherein the operation of said means for feeding punched cable tape is suspended during two successive steps of said second tape advancing means, to permit two successive Wheatstone tape punching operations on said second tape by said punching means.

HAROLD J. ROSENBERGER.

REFERENCES CITED

The following references are of record in the file of this patent:

UNITED STATES PATENTS

| Number | Name | Date |
|---|---|---|
| 1,960,425 | Woodward | May 29, 1934 |
| 2,057,111 | Potts | Oct. 13, 1936 |
| 2,087,674 | Nelson | July 20, 1937 |
| 2,273,776 | Jurek | Feb. 17, 1942 |